Sept. 17, 1935.　　　　R. R. REGLI　　　　2,014,745
TRAY
Filed June 4, 1934　　　2 Sheets-Sheet 1
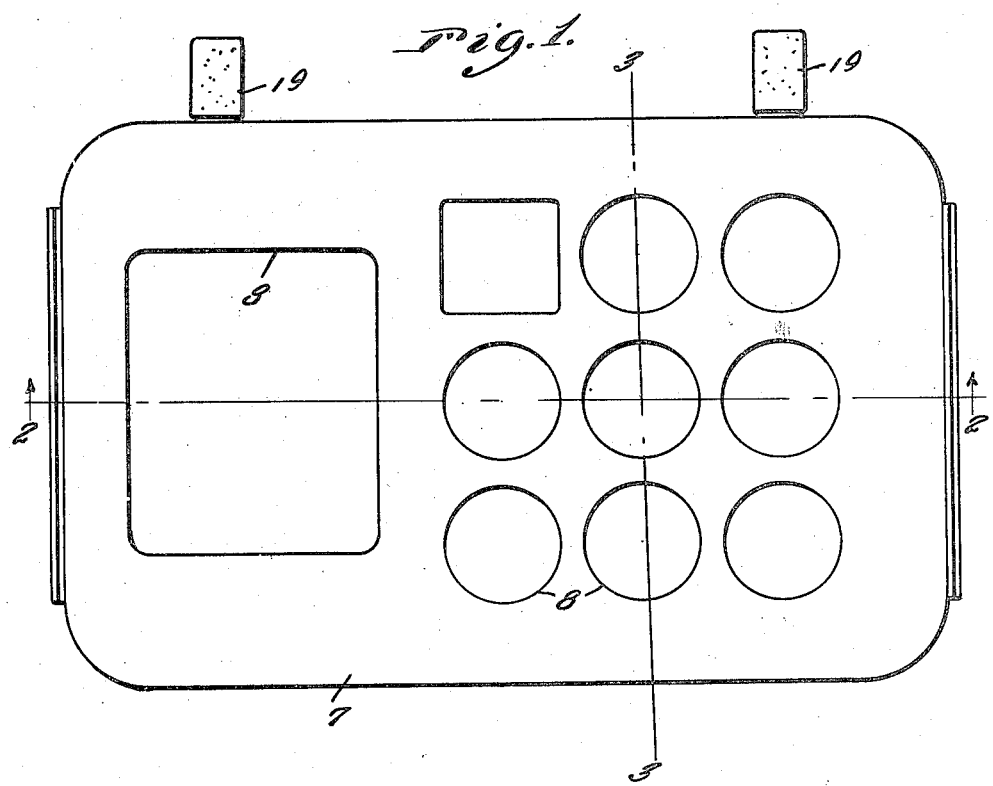
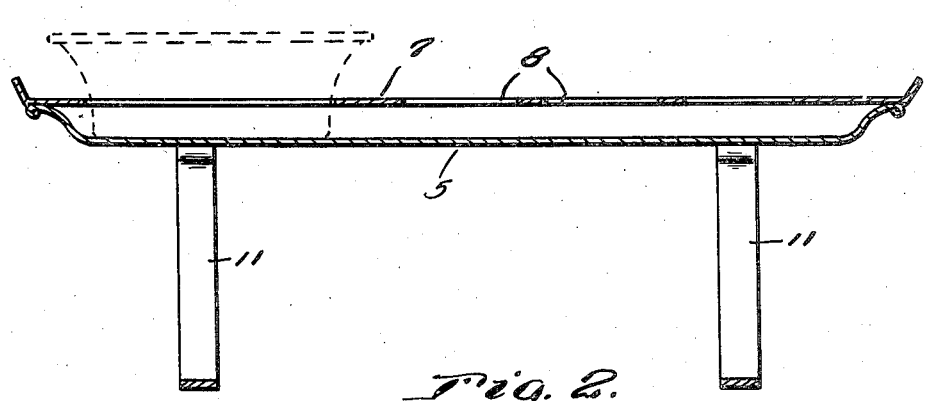
Inventor
Richard R. Regli
By Clarence A. O'Brien
Attorney Sept. 17, 1935. R. R. REGLI 2,014,745
TRAY
Filed June 4, 1934 2 Sheets-Sheet 2

Inventor
Richard R. Regli
By Clarence A. O'Brien
Attorney

Patented Sept. 17, 1935

2,014,745

UNITED STATES PATENT OFFICE 2,014,745

TRAY

Richard R. Regli, Mountain View, Calif.

Application June 4, 1934, Serial No. 728,973

1 Claim. (Cl. 311—22)

The present invention relates to improvements in trays particularly adapted to be detachably mounted upon an automobile or the like.

As is very well known, ice cream parlors, barbecues, drug stores and the like have what is known as "curb service". The waiter brings the drink, ice cream, food or the like to the automobile at the curb. My invention provides a tray adapted for use in this "curb service". The tray is so constructed that it may be quickly and conveniently mounted upon the door or window of the automobile, and will remain securely in place without liability of injury to the automobile.

Another important object of the invention resides in the provision of a tray of this nature which is exceedingly simple in its construction, inexpensive to manufacture, thoroughly efficient and reliable in use, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a top plan view of a tray embodying the features of my invention.

Figure 2 is a longitudinal vertical section therethrough taken substantially on the line 2—2 of Figure 1.

Figure 3:
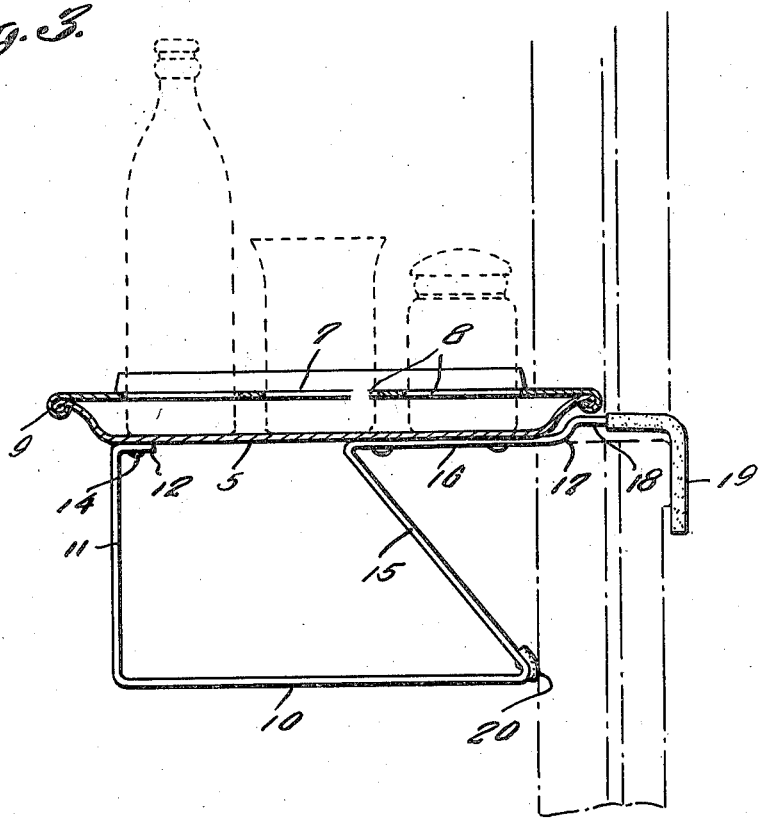
Figure 3 is a vertical transverse section taken subs'antially on the line 3—3 of Figure 1.
Figure 4:
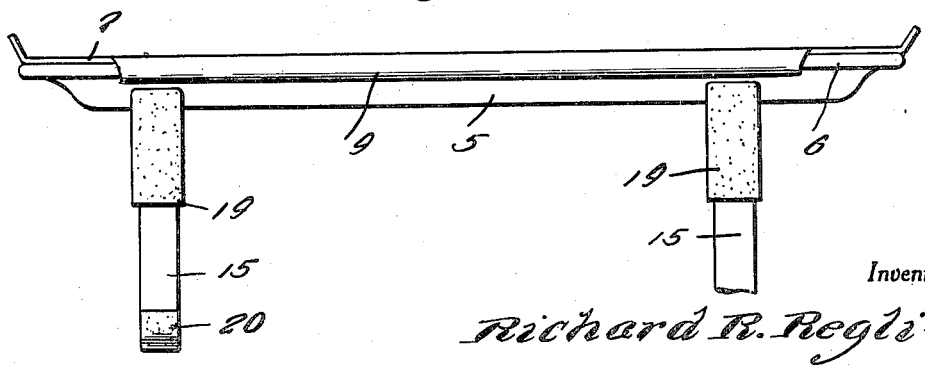
Figure 4 is a side elevation of the tray embodying the features of my invention.

Referring to the drawings in detail it will be seen that numeral 5 denotes a tray having beaded edges 6. Numeral 7 denotes a plate with a plurality of suitably shaped openings 8 provided therein for reception of different articles. This plate is provided on its side edges with sleeves 9 slidable on the side beads 6.

A pair of hangers are secured to the tray 5 and each hanger is formed from a single strip of material bent to provide an intermediate bottom portion 10 merging at one end into an upright extension 11 terminating in an inwardly directed terminal 12 riveted or otherwise secured as at 14 to the bottom of the tray. The other end of the intermediate portion 10 merges into an extension 15 which inclines upwardly at a relatively acute angle with respect to the intermediate portion 10 and merges into an outwardly directed extension 16 riveted to the bottom of the tray and having an upwardly curved intermediate portion 17 merging into a relatively L-shaped portion 18 one arm of which is disposed downwardly and this L-shaped portion 18 has a tube of rubber or o'her like material 19 mounted thereon to prevent scarring of the automobile or the like. A pad 20 is mounted on the juncture of the extension 15 with the intermediate portion 10 for the same purpose. A mere inspection of Figure 3 will show how the tray may be mounted on the door or window of an automobile.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

Supporting means for a tray comprising a pair of members each having a straight elongated bottom part, legs extending upwardly from the ends of said bottom part and having their upper ends connected with the bottom of the tray, one leg extending diagonally towards the other leg and having a substantially horizontal extension at its upper end, the outer end of which extends beyond the tray with its terminal bent downwardly to provide a hook.

RICHARD R. REGLI.